United States Patent [19]

Pall

[11] 3,985,654
[45] Oct. 12, 1976

[54] FILTER ASSEMBLY FOR FLUID POLYMERIC MATERIAL

[75] Inventor: David Boris Pall, Roslyn Estates, N.Y.

[73] Assignee: Pall Corporation, Glen Cove, N.Y.

[22] Filed: Dec. 10, 1974
(Under Rule 47)

[21] Appl. No.: 531,406

[52] U.S. Cl. .............................. 210/232; 210/437; 210/477; 210/497 R; 210/DIG. 15
[51] Int. Cl.² ....................................... B01D 29/06
[58] Field of Search .............. 425/197, 198; 210/71, 210/184, 186, 315, 316, 335, 336, 337, 338, 339, 342, 445, 446, 447, 451, 453, 456, 489, 493, 497, 499, 232, 437, 477, DIG. 15

[56] References Cited
UNITED STATES PATENTS

| 1,935,200 | 11/1933 | Bower | 425/198 |
|---|---|---|---|
| 2,269,461 | 1/1942 | Lehmberg | 55/498 |
| 3,002,870 | 10/1961 | Belgarcle et al. | 55/498 |
| 3,240,342 | 3/1966 | Callahan, Jr. et al. | 210/447 |
| 3,360,131 | 12/1967 | Witkowski | 210/456 |
| 3,447,687 | 6/1969 | Canterbury | 210/447 |
| 3,455,459 | 7/1969 | Troy | 210/315 |
| 3,698,161 | 10/1972 | Brixius | 55/500 |
| 3,710,560 | 1/1973 | Maddocks | 55/502 |
| 3,710,562 | 1/1973 | McKenzie | 55/498 |
| 3,729,279 | 4/1973 | Mott | 210/338 |
| 3,746,642 | 7/1973 | Bergstrom | 210/446 |
| 3,762,850 | 10/1973 | Werner et al. | 425/198 |
| 3,877,910 | 4/1975 | Konishi | 55/502 |

Primary Examiner—Theodore A. Granger
Assistant Examiner—Ernest G. Therkorn

[57] ABSTRACT

A filter assembly is provided for filtering fluid polymeric material, and having a filter element composed of a sheet of filter material formed in a closed configuration defining therewithin the sides of a chamber open at each end; a first closure member having a sealing surface engaging in a fluid-tight seal one end of the filter sheet at such surface under compression by fluid polymeric material, and having at least one fluid passage therethrough in communication with the chamber; and a second closure member having a sealing surface engaging in a fluid-tight seal the other end of the filter sheet at such surface under compression by fluid polymeric material, and having a pressure-receiving surface upstream of the filter element responsive to relatively higher upstream differential pressure of fluid polymeric material to press the sealing surfaces of the first and second closure members into fluid-tight sealing relationship with the ends of the filter sheet so that the higher the differential pressure of fluid polymeric material across the filter element, the higher the pressure at the seal, and the tighter the seal.

10 Claims, 7 Drawing Figures

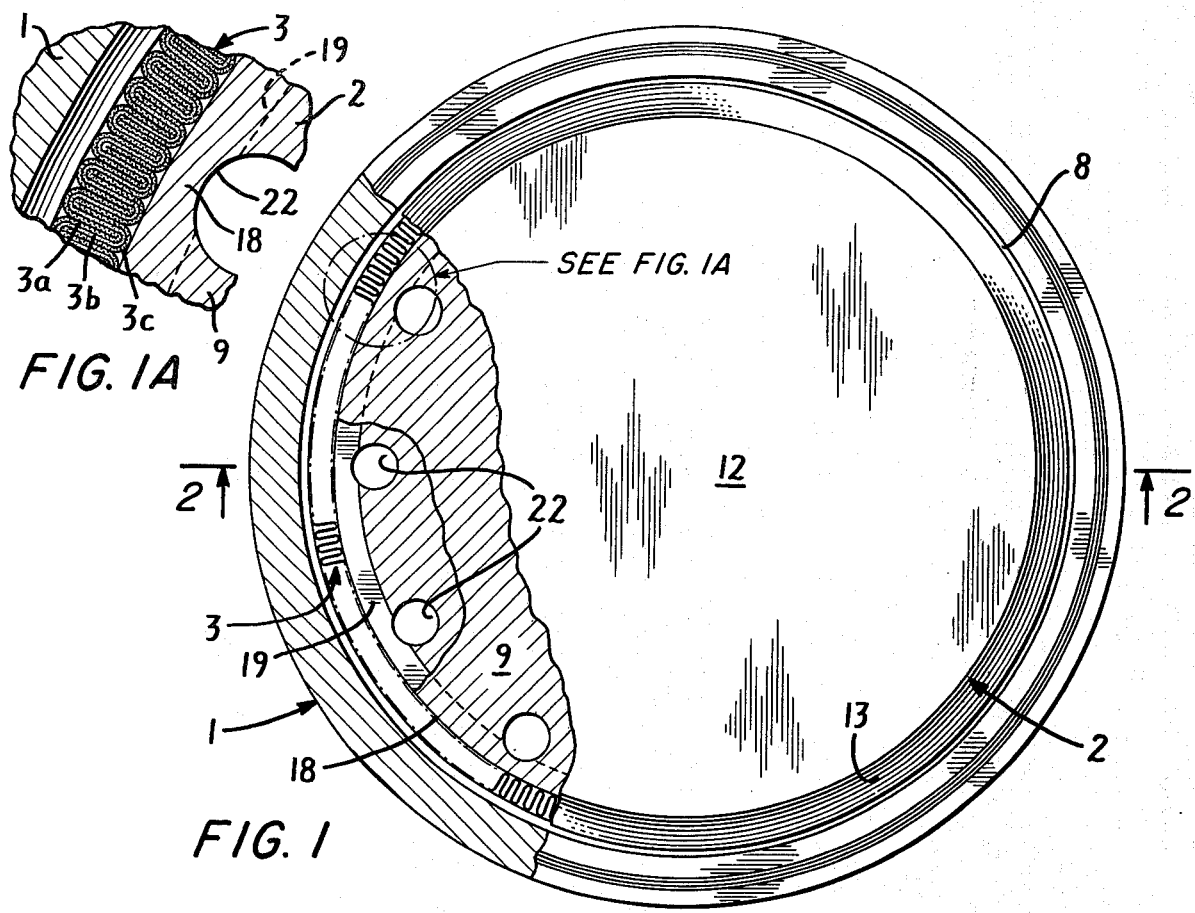
FIG. 1A
FIG. 1
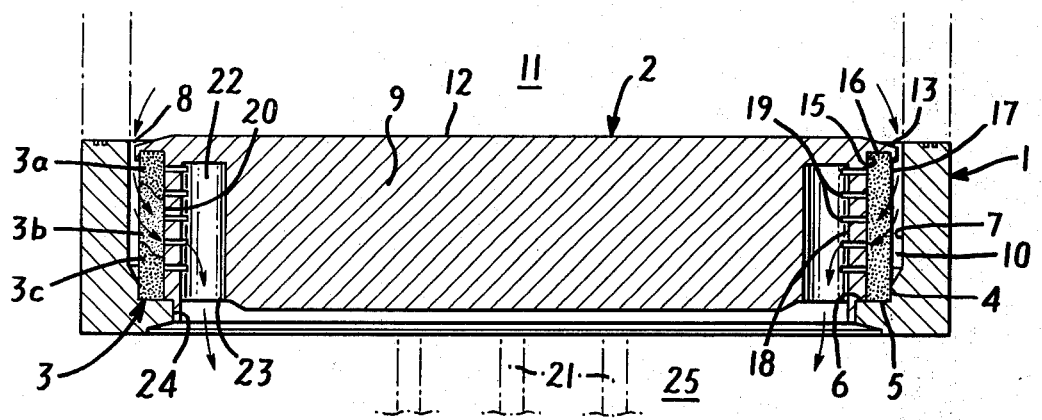
FIG. 2
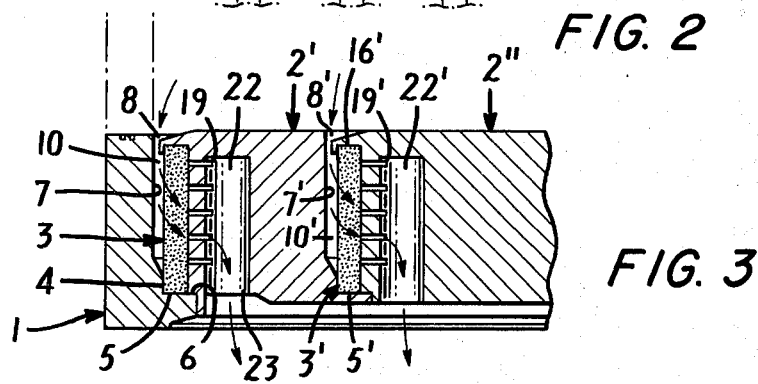
FIG. 3

FILTER ASSEMBLY FOR FLUID POLYMERIC MATERIAL

Prior to extrusion of fluid polymeric material into various shapes, such as sheets, rods, tubes and fibers, it is necessary to remove from the polymeric material suspended solid contaminants and extraneous matter that would otherwise become embedded in the extruded product. The usual way of accomplishing this is to filter the polymeric material just prior to extrusion, by way of a filter element inserted in the fluid line prior to the extruding die. The filter element can be incorporated as a component part of the extrusion die head, but in this event, in order to conserve space, a compact filter is required. In fact, only a limited amount of space is available in an extrusion die for accommodating a filter element.

This makes it rather difficult to provide a filter element having a satisfactory life that will withstand the high differential fluid pressures across the filter and the high temperatures encountered in the head just prior to extrusion. A high filter surface area is necessary for a long life, but the high fluid pressure differentials, which are compounded by the frequently relatively high viscosity of the fluid polymeric material, restrict filter size because they require strong internal support of the filter element, to prevent collapse or rupture of the filter sheet.

Because of these special problems, conventional cylindrical filter elements provided with end caps are not entirely satisfactory. Most types of seals between filter elements and end caps are susceptible to development of leaks due to opening or rupture of the seal at high internal fluid pressure differentials, particularly at high operating temperatures, and when they are formed by the use of adhesives or binders, or by imbedding the filter sheet in the end cap material. Moreover, the differential pressure limit may decrease as operating temperature increases, due to softening of the adhesive or binder. In all of these cases, there is an absolute differential pressure limit beyond which the seal becomes unreliable. Leakage past a filter element in extrusion equipment can of course lead to plugging of the equipment, especially if there is a precipitate unloading of the contents of the filter downstream, into the extrusion die passages.

In accordance with the invention, a filter assembly is provided that is capable of filtering viscous fluid polymeric material subjected to high internal differential fluid pressures at high operating temperatures in which the filter element is retained in a fluid-tight seal that actually becomes tighter as the internal fluid pressure increases. The filter assembly moreover provides an extremely high surface area of filter within a small space, and therefore is readily accommodated in-line in an extrusion head or die.

The filter assembly in accordance with the invention comprises, in combination, a filter element composed of a sheet of filter material formed in a closed configuration, defining therewithin the sides of a chamber open at each end; a first closure member having a sealing surface and engaging in a fluid-tight seal one end of the filter sheet at such surface under compression by fluid polymeric material, having at least one fluid passage therethrough in communication with the chamber; and a second closure member having a sealing surface engaging in a fluid-tight seal the other end of the filter sheet of such surface under compression by fluid polymeric material, and having a pressure-receiving surface upstream of the filter element, responsive to pressure of fluid polymeric material to press the sealing surfaces of the first and second closure members into fluid-tight sealing relationship with the ends of the filter sheet, so that the higher the upstream pressure of fluid polymeric material, the higher the pressure at the seal, and the tighter the seal.

In a preferred embodiment of the invention, the second closure member is in the form of an insert or plug fitting within the chamber defined by the filter element, and having a wall extending beside the filter element and serving as an internal support for the filter element, filling in most but not all of the chamber enclosed by the filter sheet, and the pressure-receiving surface constitutes the entire outer upstream wall of the closure member.

Preferred embodiments of the filter assembly in accordance with the invention are illustrated in the drawings, in which:

FIG. 1 represents a top view with parts cut away of on embodiment of a filter assembly in accordance with the invention;

FIG. 1A is a detailed view of the portion delineated in FIG. 1;

FIG. 2 represents a cross-sectional view taken along the line 2—2 of FIG. 1;

FIG. 3 represents a cross-sectional view of another embodiment of filter assembly in accordance with the invention, having provision for installation of multiple concentric filter elements and corresponding concentric closure members;

Figure 4:
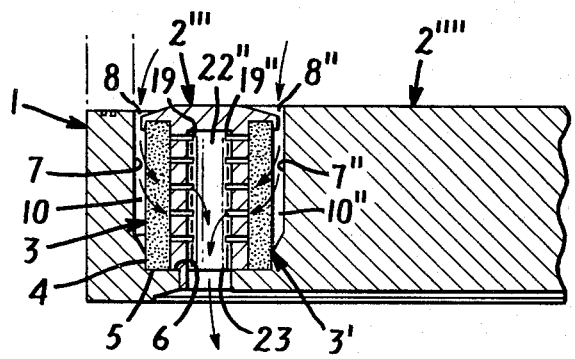
FIG. 4 represents a cross-sectional view of another embodiment of filter assembly in accordance with the invention, with multiple concentric filter elements.

The filter assembly shown in FIGS. 1 and 2 constitutes a polymer breaker plate assembly for insertion directly in-line in the primary polymer flow passage of an extrusion die, for use in the spinning of fibers from molten polymer, such as polyamides and polyesters.

The filter assembly comprises a first closure member 1, a second closure member 2, and a tubular filter element 3 confined therebetween in a seal therewith at each end. The filter element is a three-layer composite, best seen in FIG. 1-A, composed of inner and outer coarse wire mesh screens $3a$, $3c$ with a fine wire mesh screen $3b$ sandwiched therebetween, serving as the filter sheet, all corrugated together and formed in a cylindrical configuration. The screens and closure members are preferably of stainless steel or ceramic-coated metal.

The first closure member 1 is an annulus or shell defining a central aperture 24, and formed with a recess of ledge 4 having a sealing surface 5 at its base engaging one end 6 of the filter cylinder 3. A fluid-tight seal arising from differential fluid pressure across the filter 3 is formed between surfaces 5 and 6, and the ends of the composite screens $3a$, $3b$, $3c$ as will presently be seen.

The inner wall 7 of the closure member 1 is spaced away from filter element 3, defining an upstream annular chamber 10, for distribution of unfiltered fluid polymer to all portions of the upstream surface of the filter element 3. This chamber is in fluid communication via annular opening or port 8 with the main fluid polymer inlet line 11 for the extrusion die.

The second closure member 2 is a plug whose body portion 9 fills in most of the open space of the chamber defined within the filter element 3, and has a large-area pressure-receiving surface 12 on the outer face. At its external periphery is a flange 13, with an inwardly turned tip defining a recess or groove 15 which snugly receives the other end 17 of the filter element 3, and has a sealing surface 16 engaging the edge of the filter sheet at that end.

Extending from the inner side of the groove or recess 15 of the closure 2 is a porous annular wall 18, in this case porous because it is provided with a plurality of slots or passages 19. The wall 18 is arranged to fit closely against the inner tips 14 of the corrugations 20 of the filter element 3. This wall serves as an internal support or core for the filter element 3, and the slots 19 normally serve as passages for conducting filtered fluid away from the filter element, since this wall is downstream of the filter element.

Behind the wall 18 in the body portion 9 of closure 2 are a plurality of chambers 22, which are bored in the body portion 9 and are open at the end 23, and in fluid communication with the aperture or passage 24 through the first closure member 1, leading to the extrusion passages or orifices 21 of the extruder die 25, downstream of the filter assembly.

It will now be apparent that higher upstream differential fluid pressure across the filter element 3 in the line 11, accepted at the pressure-receiving surface 12 of the second closure member 2, is applied via the sealing surface 16 to one end 17 of the filter element 3, and then through the filter element to the other end 6 thereof to sealing surface 5 of the first closure member 1. The surfaces of the edges of the filter sheet at the ends 6, 17 are so formed that a fluid-tight seal is formed with the sealing surfaces 5, 16 under normal operating differential fluid pressure of fluid polymer in the line 11. It is apparent that as the differential pressure increases, so does the tightness of the seal. Thus, the seal is self-adjusting and is tight enough at all fluid pressure differentials to withstand the development of leaks. At the same time, because of the absence of any adhesive or binder, removal or replacement of the filter element 3 is quite simple. All that needs to be done is remove the second closure member 2, whereupon the filter element 3 is loose and accessible, can be removed and changed, and the closure member then replaced. The seal is reformed under differential fluid pressure arising from the line 11.

In operation, the flow of fluid polymer proceeds from line 11 to the annular port 8 between the flange 13 of the closure member 2 and the top of the closure member 1 into the annular chamber 10. Thence, the polymer flows through the interstices of the corrugated sheets of the composite 3a, 3b, 3c constituting the filter element 3, where the suspended solid contaminants are removed. The filtered fluid polymer proceeds through the slots or passages 19 into the chambers 22, and thence via ports 23 and passages 24 into the downstream extrusion passages 21, now clean and ready for extrusion.

The filter assemblies of FIGS. 3 and 4 are quite similar to that of FIG. 1, and consequently like reference numerals are used for like parts.

In the structure shown in FIG. 3, the second closure member 2 is provided in two concentric portions, 2', 2'', each portion receiving and sealing at one end with one of a pair of concentric filter elements 3, 3'. Of these filter elements, the external element 3 is retained exactly as in the device of FIGS. 1 and 2. The inner element 3' is retained between the inner and outer closure members 2', 2'', between the sealing surfaces 5', 16', corresponding to the sealing surfaces 5, 16 engaging the outer concentric filter element 3. A plurality of chambers 22, 22' are provided in two annular rows in closure members 2', 2'', respectively, for reception of filtered fluid; both feed into the same passage 24 of the first closure member, and thence to the extruder passages 21.

FIG. 4 represents a further modification, in which the inner of two concentric closure members 2''', 2'''' is arranged so that filtered fluid polymer is fed into a plurality of common receiving chambers 2''. Consequently, the outer 2''' of the concentric members includes all of the chambers 22'', whereas the inner 2'''' of the two concentric members is a solid plate carrying the supporting recess for the filter element 3'.

Figure 5:
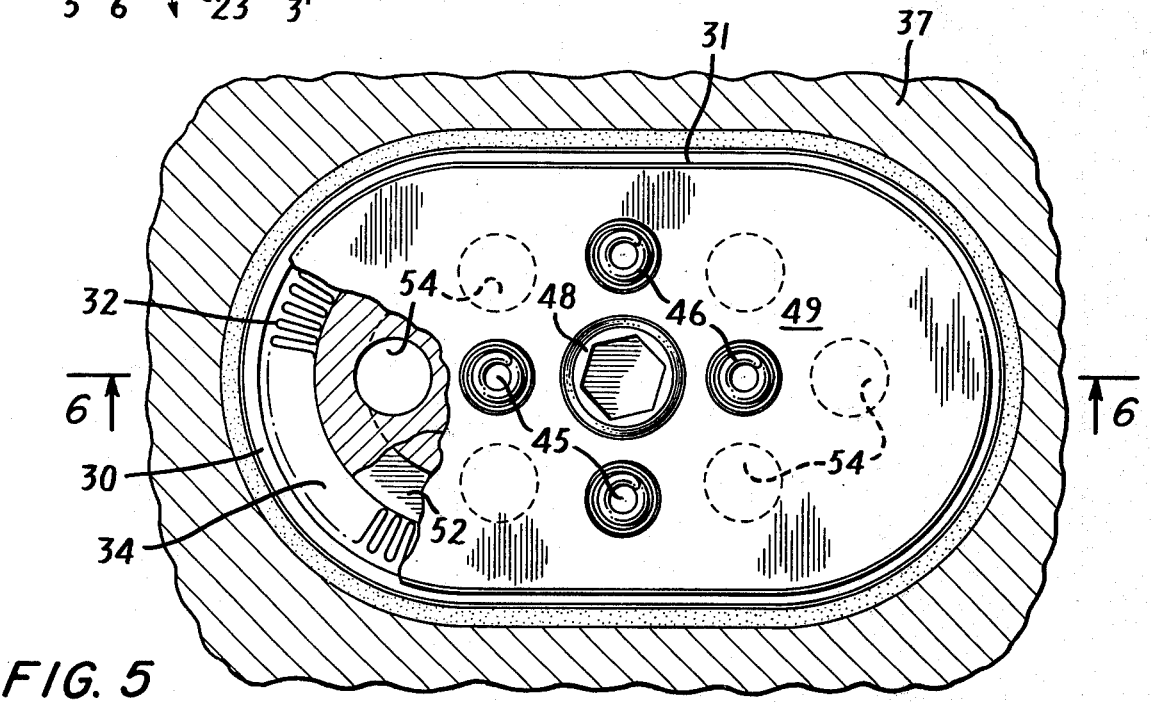
FIG. 5 represents a top view, with parts cut away, of another embodiment of filter assembly in accordance with the invention providing a seal that is leak-tight even before the development in the assembly of a sufficiently high differential pressure of fluid polymeric material.
Figure 6:
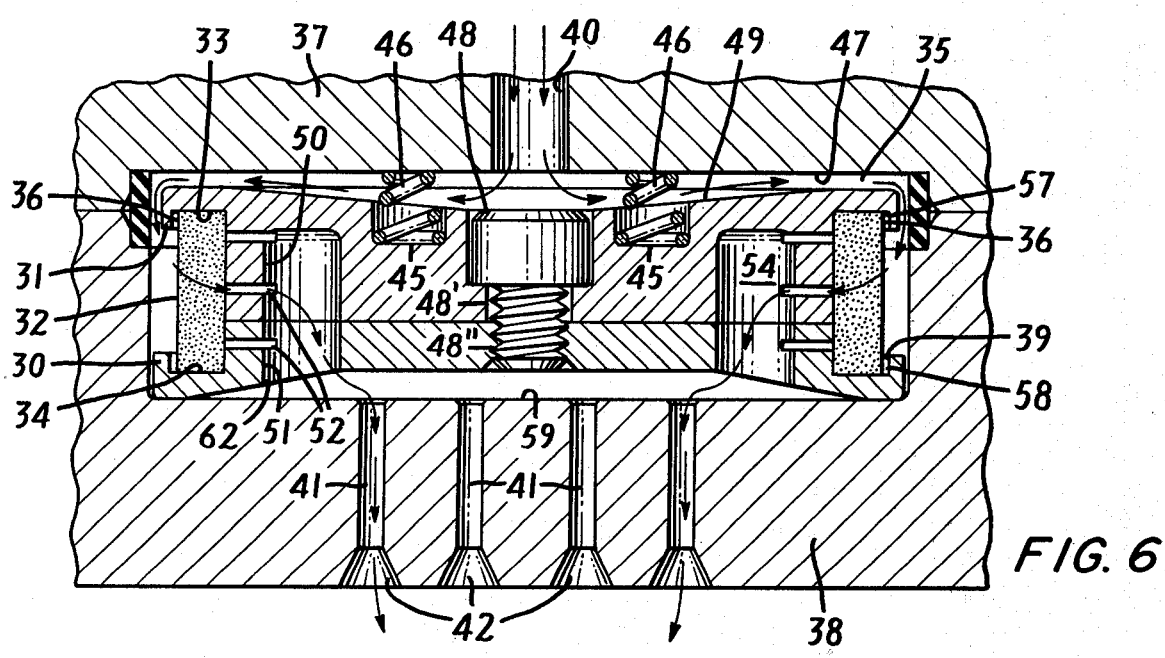
FIG. 6 represents a cross sectional view taken along the line 6—6 of FIG. 5.

FIGS. 5 and 6 represent another embodiment in which springs are provided to ensure a good seal between the first and second closure members and the filter element until the internal fluid pressure differential becomes high enough to provide a fluid-tight seal per se.

The filter assembly of FIGS. 5 and 6 comprises a first closure member 30 and a second closure member 31, confining the ends 36, 39 of a filter cylinder 32 therebetween, in recesses or annular grooves 57, 58 between sealing surfaces 33, 34 at the base of the recesses of the closure members 30, 31.

The closure members 30, 31 are retained together by head cap screw 48, threaded in bores 48', 48'' in closure members 30, 31, and the filter assembly is confined in a chamber 35, defined between two portions 37, 38 of the extrusion head or die. An upstream passage 40 in the die carries unfiltered fluid polymer to the chamber 35 and the filter assembly, and a plurality of passages 41 carry filtered fluid polymer from the chamber 35 downstream of the filter assembly directly to the extrusion orifices 42.

The second closure member 31 has a plurality of bores or sockets 45, in this case four, evenly spaced as seen in FIG. 5, receiving compression springs 46 seated in the bores 45 at one end, and at the other end engaging the wall 47 of the housing portion 37. They accordingly apply a compressive force to the closure member 31, and through it to the sealing surfaces 33, 34 and the filter element ends 36, 39 the closure member 30 being held in position against the wall 59 of die portion 38, ensuring a tight seal therewith that is resistant to leakage while the system pressure differential is insufficient to do so.

The closure member 31 has a pressure-receiving surface 49 on its upstream side which serves to receive the high upstream differential fluid pressure when the system is in operation, and amplify the compressive force of the springs.

Each of the housing member 30, 31 have walls 50, 51 extending from recesses 57, 58 which meet in a manner to define an internal supporting wall for the filter element 32. These walls have annular slots or passages 52 therethrough, leading through the abutting walls 50, 51, to a plurality of chambers 54, bored in the housing parts 30, 31. One end 62 of these chambers is open, in fluid communication with the chamber 35 on the downstream side of the filter element 32 between the housing portion 38 and the filter assembly.

In operation, unfiltered fluid polymeric material flowing into the extrusion head assembly via passage 40 enters the chamber 35 on the upstream side of the filter assembly between the filter assembly and wall 47, to and through the filter element 32 and passages 52 into the chambers 54, and thence back into the chamber 35, but now on the downstream side of the filter assembly, between it and wall 59, and thence through passage 41 to the extrusion orifices 42.

It will thus be seen that as fluid pressure increases in the passage 40 and in the upstream portion of the chamber 35, this increased fluid pressure is communicated via pressure-receiving surface 49 of the closure member 31 to the sealing surfaces 33, 34 and the filter element 32, thus tightening the already fluid-tight seal between these parts, and ensuring no leakage at the higher fluid pressure.

The filter assembly in accordance with the invention can be used in extrusion equipment for fluid or molten polymeric material of all kinds, but particularly fluid polymeric materials of high viscosity, such as polyamides, polyesters, polyacrylonitrile, polyvinyl chloride, polyvinylidene chloride, polypropylene, polyethylene, polybutylene, polyisobutylene, copolymers of vinyl chloride and vinyl acetate, polytetrafluoroethylene, and fluoroethylene fluoropropylene copolymers, as well as thermoplastic cellulosic materials such as ethyl cellulose.

While the drawings illustrate the use of stainless steel wire mesh as the filter material, any other filter sheet materials of metal or plastic having a softening point above the melt temperature of the fluid polymeric material, can be used, including sintered stainless steel, extruded plastic netting, woven plastic mesh, perforated sheet materials, and sinter-bonded nonwoven fibrous mats and bats.

In the drawings, the use of metal materials as the closure members is illustrated, but plastic materials can also be used, provided of course that they can withstand the extrusion temperatures and pressures. Polytetrafluoroethylene and fluoroethylene fluoroethylene copolymers are particularly suitable, but the thermosetting resins can also be used, such as phenol-formaldehyde, urea-formaldehyde, and polycarbonate resins.

Having regard to the foregoing disclosure, the following is claimed as inventive and patentable embodiments thereof:

1. A filter assembly for filtering viscous fluid polymeric material under pressure, said assembly comprising a sheet of filter material defining the sidewall of a first chamber therewithin, open at each end; first closure means with an opening therethrough extending across one open end of said chamber, the opening providing an outlet therefrom; means constructed and arranged around the peripheral edge of said closure means providing a sealing surface for said filter sheet end at said chamber one end, said means further being arranged to extend upwardly and outwardly therefrom to define a second chamber outside said sheet of filter material and second closure means loosely engaged in sealing relationship with the opposite filter end, and closing off the other end of said chamber; whereby fluid under pressure against said closure means is directed into said second chamber for filtering and said pressure sealingly engages the filter ends against the first and second closure means.

2. A filter assembly in accordance with claim 1, in which one of the first and second closure means has a porous wall defining a support for the filter sheet.

3. A filter assembly in accordance with claim 2, in which the porous wall is integral with the closure means.

4. A filter assembly in accordance with claim 2, in which the porous wall has a plurality of passages therethrough.

5. A filter assembly in accordance with claim 1, in which the filter sheet is wire mesh.

6. A filter assembly in accordance with claim 1, in which the first and second closure means are concentric with the filter sheet.

7. A filter assembly in accordance with claim 1, in which the first closure means has a recess receiving one end of the filter sheet and a sealing surface constituting one wall of the recess, engaging the edge of the filter sheet at that end; and the second closure means has a recess receiving the other end of the filter sheet and a sealing surface constituting one wall of the recess and engaging the edge of the filter sheet at said other end.

8. A filter assembly in accordance with claim 1, in which the second closure means is a solid plate, fitting within the chamber defined by the filter sheet, with one external face serving as the pressure-receiving surface.

9. A filter assembly in accordance with claim 8, in which the filter sheet is in cylindrical corrugated form, and the second closure means fills in substantially all of the chamber defined within the filter sheet, with a porous wall serving as a supporting internal core for the filter sheet defining with the remainder of the closure means at least one chamber for reception of filtered fluid passing through the filter sheet.

10. A filter assembly in accordance with claim 1, having a plurality of concentric filter sheets and a plurality of concentric second closure means, each having a sealing surface engaging one end of the filter sheet of such concentric filter sheets under pressure of filter polymeric material in fluid-tight seal, and having a pressure receiving surface upstream of the filter sheets responsive to higher upstream differential pressure of fluid polymeric material to press the sealing surfaces into fluid-tight relationship with the ends of the filter sheets in contact therewith.

* * * * *